(12) United States Patent
Oku et al.

(10) Patent No.: US 8,009,247 B2
(45) Date of Patent: Aug. 30, 2011

(54) LIGHT SOURCE APPARATUS, BACKLIGHT APPARATUS, LIQUID CRYSTAL DISPLAY APPARATUS, AND MANUFACTURING METHOD OF BACKLIGHT APPARATUS

(75) Inventors: Takashi Oku, Kanagawa (JP); Naoto Kobayashi, Chiba (JP); Tomohisa Uba, Tokyo (JP)

(73) Assignee: Sony Corporation, Tokyo (JP)

( * ) Notice: Subject to any disclaimer, the term of this patent is extended or adjusted under 35 U.S.C. 154(b) by 834 days.

(21) Appl. No.: 11/942,456

(22) Filed: Nov. 19, 2007

(65) Prior Publication Data

US 2008/0117356 A1 May 22, 2008

(30) Foreign Application Priority Data

Nov. 21, 2006 (JP) .................. 2006-314640

(51) Int. Cl.
*G02F 1/1335* (2006.01)
*G09F 13/04* (2006.01)
(52) U.S. Cl. ......................... 349/69; 362/97.3
(58) Field of Classification Search ................ 349/69; 362/97.3
See application file for complete search history.

(56) References Cited

U.S. PATENT DOCUMENTS

| 2007/0014098 A1* | 1/2007 | Park et al. ................ 362/29 |
| 2007/0182887 A1* | 8/2007 | Haga et al. .................. 349/106 |
| 2008/0018830 A1* | 1/2008 | Negley .............................. 349/69 |

FOREIGN PATENT DOCUMENTS

| DE | 102006002275 | 7/2006 |
| EP | 1594172 | 11/2005 |
| EP | 1748250 | 1/2007 |
| EP | 1785764 | 5/2007 |
| JP | 06-088961 | 3/1994 |
| JP | 8-272316 | 10/1996 |
| JP | 11295737 | 10/1999 |
| JP | 2003-0047173 | 6/2003 |
| JP | 2005-332680 | 12/2005 |
| WO | 2006-019085 | 2/2006 |
| WO | WO 2006019016 A1 * | 2/2006 |

OTHER PUBLICATIONS

EP Communication dated Mar. 19, 2008 for Application No. 08021651.0-2205 (Foreign references 1-3 included in this Communication).
EP Communication dated Jul. 7, 2008 for Application No. 07021651.0-2205/1925971 (Foreign references 4-10 in this Communication).

* cited by examiner

*Primary Examiner* — Michael H Caley
(74) *Attorney, Agent, or Firm* — SNR Denton US LLP

(57) ABSTRACT

A light source apparatus used in a backlight apparatus is disclosed. The light source apparatus includes a light-emitting diode unit and a wiring board. The light-emitting diode unit is provided as one unit by nonlinearly and closely placing respective light-emitting diodes of red, green, and blue colors, at least the light-emitting diode of one color out of the light-emitting diodes of the respective colors being constituted by first and second light-emitting diodes having different chromaticities such that an average chromaticity of the first and second light-emitting diodes is a predetermined chromaticity. On the wiring board, a plurality of light-emitting diode units are arranged at predetermined intervals in a predetermined direction.

9 Claims, 12 Drawing Sheets

| Red Light-Emitting Diode (R) | | Chromaticity | | |
| --- | --- | --- | --- | --- |
| | | 1 | 2 | 3 |
| Luminance | a | a-1 | a-2 | a-3 |
| | b | b-1 | b-2 | b-3 |
| | c | c-1 | c-2 | c-3 |
| | d | d-1 | d-2 | d-3 |
| | e | e-1 | e-2 | e-3 |
| Green Light-Emitting Diode (G) | | Chromaticity | | |
| | | 1 | 2 | 3 |
| Luminance | a | a-1 | a-2 | a-3 |
| | b | b-1 | b-2 | b-3 |
| | c | c-1 | c-2 | c-3 |
| | d | d-1 | d-2 | d-3 |
| | e | e-1 | e-2 | e-3 |
| Blue Light-Emitting Diode (B) | | Chromaticity | | |
| | | 1 | 2 | 3 |
| Luminance | a | a-1 | a-2 | a-3 |
| | b | b-1 | b-2 | b-3 |
| | c | c-1 | c-2 | c-3 |
| | d | d-1 | d-2 | d-3 |
| | e | e-1 | e-2 | e-3 |

FIG.5

|  | JND(500p) | | |
|---|---|---|---|
| R | 1bin | 1bin | 1bin |
| G | 1bin | 2bin | 3bin |
| B | 1bin | 2bin | 3bin |
| Mean Value | 2.7 | 3.0 | 3.4 |
| Maximum Value | 3.6 | 4.0 | 4.8 |
| Minimum Value | 2.0 | 2.3 | 2.5 |
| Variance($\sigma$) | 0.3 | 0.4 | 0.4 |
| Determination Result | OK | NG | NG |

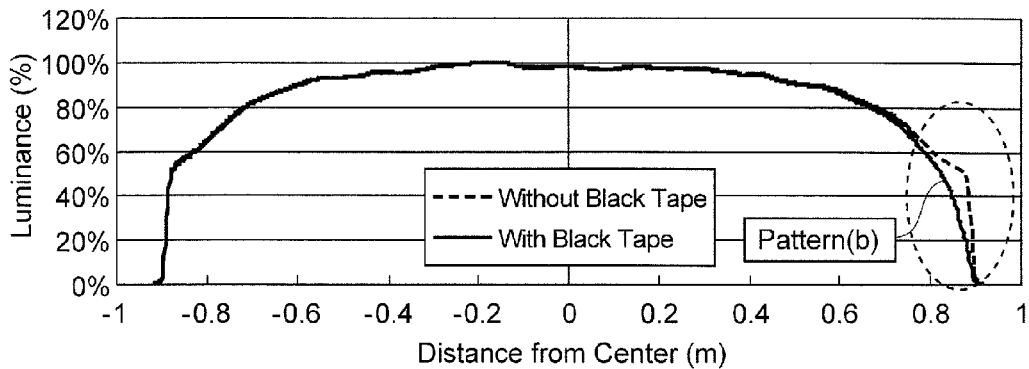
FIG.11A
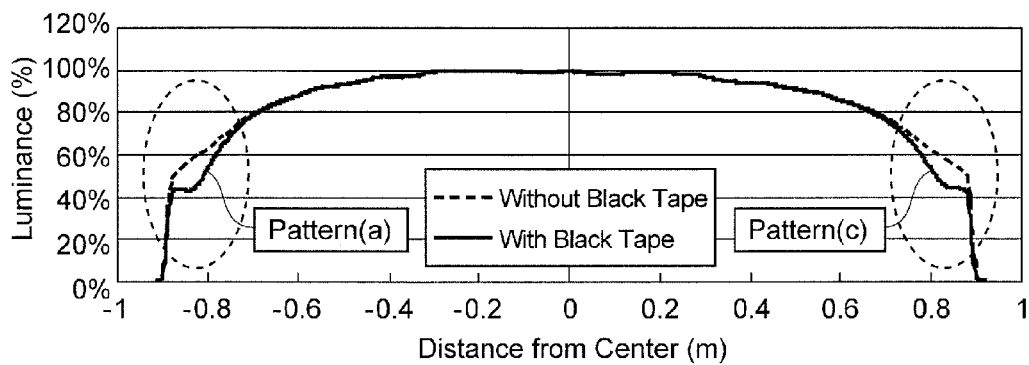
FIG.11B
| Black Tape | Luminance Reduction (max) |
|---|---|
| Pattern (a) | 16% |
| Pattern (b) | 30% |
| Pattern (c) | 11% |
FIG.11C Chromaticity Cy Distribution Chromaticity Cx Distribution Color Difference Distribution

LIGHT SOURCE APPARATUS, BACKLIGHT APPARATUS, LIQUID CRYSTAL DISPLAY APPARATUS, AND MANUFACTURING METHOD OF BACKLIGHT APPARATUS

CROSS REFERENCES TO RELATED APPLICATIONS

The present invention contains subject matter related to Japanese Patent Application JP 2006-314640 filed in the Japanese Patent Office on Nov. 21, 2006, the entire contents of which being incorporated herein by reference.

BACKGROUND OF THE INVENTION

1. Field of the Invention

The present invention relates to a light source apparatus using an LED (Light-emitting Diode), a backlight apparatus equipped with the light source apparatus, a liquid crystal display apparatus equipped with the backlight apparatus, and a manufacturing method of the backlight apparatus.

2. Description of the Related Art

In the past, in an LCD (Liquid Crystal Display) mounted in an electronic apparatus such as a liquid crystal television, a PC (Personal Computer), or the like, an image has been displayed by placing a backlight on the back surface side of the LCD and illuminating the back surface of the LCD with the backlight. As a light source of this backlight, a CCFL (Cold Cathode Fluorescent Lighting) has been used in the past.

In recent years, an LED has been considered to be a hopeful light source to replace this CCFL. The use of the LED enables an increase in efficiency and an increase in color gamut and eliminates an adverse effect on the environment since unlike the CCFL, mercury is not used.

However, the LED generally varies in both chromaticity and luminance more widely than other light sources such as the above CCFL. Therefore, if the LED distributed in the marketplace is randomly used as the light source for the backlight, uniformities of both chromaticity and luminance become lower (uneven color and uneven luminance increase), and the yield of the backlight apparatus extremely deteriorates. Thus, the LED is not suitable for mass production.

As a technique to solve these problems of uneven color and uneven luminance, for example, Japanese Patent Application Laid-Open No. 2006-133708 (paragraph [0096], FIG. 15, etc.) discloses the following technique. That is, a light emitting diode unit formed with an aim to obtain a predetermined chromaticity and luminance using a plurality of light-emitting diodes having variations in chromaticity and luminance of emitted white light is used as a light source of a backlight apparatus. In this case, a plurality of light-emitting diode units of two types, main and sub types, which emit white lights having different chromaticities or luminances are arranged in columns such that sub light-emitting diode units are not arranged side by side on the same row. In addition, the sub light-emitting diode units arranged in the central column of a two-dimensional matrix are arranged on the central side of a liquid crystal panel. As a result, the occurrence of uneven color and uneven luminance of the whole backlight apparatus is prevented.

Further, Japanese Patent Application Laid-Open No. 2004-342608 (paragraph [0005], etc.) discloses a backlight illumination system. In the backlight illumination system, when a predetermined number of LED sets having different chromaticities are arranged on a straight line, respective LED sets having substantially the same chromaticity are arranged at substantially even intervals, so that uniform color as a whole can be obtained.

Furthermore, Japanese Patent Application Laid-Open No. 2005-332828 (paragraph [0024], etc.) discloses the following technique. That is, in arranging a plurality of LEDs in sequence, the respective LEDs are sorted according to their luminance levels, and the LED having a lower luminance is provided at a position corresponding to an end portion of an LCD, thereby attaining chromaticity uniformity of a backlight.

SUMMARY OF THE INVENTION

However, in any of the respective techniques described in the above respective Patent Documents, after LEDs of respective red, green, and blue colors are unitized, variations in chromaticity and luminance of white light into which lights of the respective colors are mixed are tried to be made uniform, and hence no consideration is given to variations in chromaticity and luminance among LEDs of each color.

To begin with, the variations in chromaticity and luminance of white light are caused by variations in chromaticity and luminance among LEDs of each color, and according to each color, the degree of its variations varies. For example, out of the three-color LEDs, the green LED varies in chromaticity and luminance most widely. However, in the techniques described in the above respective Patent Documents, the LEDs of respective colors in the unit are not allowed to be replaced, so that it is necessary to adjust the variations in chromaticity and luminance on a unit-by-unit basis, leading to a great reduction in the flexibility of selection of respective LEDs. As a result, uneven color and uneven luminance sometimes still occur without accommodating the variations in chromaticity and luminance.

In view of the above circumstances, it is desirable to provide a light source apparatus capable of increasing chromaticity and luminance uniformities by increasing the flexibility of selection of LEDs of respective colors, a backlight apparatus equipped with this light source apparatus, a liquid crystal display apparatus equipped with this backlight apparatus, and a manufacturing method of this backlight apparatus.

It is also desirable to prevent uneven luminance due to uneven temperature of a peripheral edge portion of a liquid crystal panel.

According to an embodiment of the present invention, there is provided a light source apparatus used in a backlight apparatus. The light source apparatus includes: a light-emitting diode unit provided as one unit by nonlinearly and closely placing respective light-emitting diodes of red, green, and blue colors, at least the light-emitting diode of one color out of the light-emitting diodes of the respective colors being constituted by first and second light-emitting diodes having different chromaticities such that an average chromaticity of the first and second light-emitting diodes is a predetermined chromaticity; and a wiring board on which a plurality of the light-emitting diode units are arranged at predetermined intervals in a predetermined direction.

With this structure, concerning at least the light emitting diode of one color, a plurality of light-emitting diodes having different chromaticities which satisfy the condition that their average chromaticity becomes the above predetermined chromaticity can be used without fixing their chromaticities. Therefore, even if there are variations in chromaticity among the light-emitting diodes, by well combining these light-emitting diodes such that their average chromaticity is the predetermined chromaticity, the variations in chromaticity can be accommodated and excess light-emitting diodes can be eliminated. Namely, by increasing the flexibility of selection of light-emitting diodes of respective colors, chromaticity uniformity is increased, resulting in an improvement in the yield of the light source apparatus.

Further, compared to a case where light-emitting diodes of respective colors are arranged in a row in respective light-emitting diode units, the distance between the respective light-emitting diode units can be increased, which can prevent occurrence of chromaticity unevenness caused by respective light-emitting diodes of a specific color being placed adjacent to each other between different light-emitting diode units. Note that the above predetermined interval is, for example, about 60 mm, and the number of light-emitting diode units in one light source apparatus is, for example, six, but they are not limited to these values.

In the above light source apparatus, the respective light-emitting diode units each may include one red light-emitting diode, one blue light-emitting diode, one first green light-emitting diode having a first chromaticity, and one second green light-emitting diode having a second chromaticity which is different from the first chromaticity, the average chromaticity of the first chromaticity and the second chromaticity being the predetermined chromaticity.

Hence, variations in chromaticity which are large especially in the green light-emitting diode out of three primary colored ones can be accommodated, resulting in a further improvement in yield.

In the respective light-emitting diode units of the above light source apparatus, the red light-emitting diode and blue light-emitting diode may be provided on a first straight line nearly parallel to the predetermined direction on the wiring board, and the first and second green light-emitting diodes may be provided on a second straight line nearly orthogonal to the first straight line such that respective distances from the red light-emitting diode and blue light-emitting diode become nearly equal.

Hence, by placing one red and one blue light-emitting diodes in a horizontal direction and two green light-emitting diodes in a vertical direction, that is, placing four light-emitting diodes in a cross shape in one light-emitting diode unit, compared to the case where all light-emitting diodes of respective colors are placed in a row, the distances between respective first and second green light-emitting diodes between the respective light-emitting diode units can be increased. Therefore, it is possible to prevent color mixture of the respective first and second green light-emitting diodes between the respective light-emitting diode units while accommodating variations among the green light-emitting diodes, thereby suppressing occurrence of uneven color.

In this light source apparatus, the respective light-emitting diode units are provided such that the respective first and second green light-emitting diodes may be arranged in a zigzag manner along the predetermined direction.

Thus, compared to the case where the respective first and second green light-emitting diodes of the respective light-emitting diode units are arranged in a row in the predetermined direction, the variations in chromaticity can be further accommodated.

In the respective light-emitting diode units of the above light source apparatus, the first and second green light-emitting diodes may be provided such that an average luminance of a first luminance of the first green light-emitting diode and a second luminance of the second green light-emitting diode which is different from the first luminance is a predetermined luminance.

Consequently, by well combining the first and second green light-emitting diodes which are different not only in chromaticity but also in luminance such that the predetermined luminance can be obtained, variations in luminance among the respective green light-emitting diodes can be accommodated. Therefore, it is possible to further increase the absolute number of green light-emitting diodes usable in the light source apparatus and further improve the yield of the light source apparatus.

A light source apparatus according to another embodiment of the present invention is a light source apparatus used in a backlight apparatus. The light source apparatus includes: a light-emitting diode unit provided as one unit by nonlinearly and closely placing respective light-emitting diodes of red, green, and blue colors, at least the light-emitting diode of one color out of the light-emitting diodes of the respective colors being constituted by a plurality of light-emitting diodes having different luminances such that an average luminance of the first and second light-emitting diodes is a predetermined luminance; and a wiring board on which a plurality of the light-emitting diode units are arranged at predetermined intervals in a predetermined direction.

With this structure, by increasing the flexibility of selection regarding luminance of at least the light-emitting diode of one color described above, the variations in luminance can be accommodated, and luminance uniformity can be improved, resulting in an improvement in the yield of the light source apparatus.

A backlight apparatus according to an embodiment of the present invention includes: a light source apparatus having a light-emitting diode unit provided as one unit by nonlinearly and closely placing respective light-emitting diodes of red, green, and blue colors, at least the light-emitting diode of one color out of the light-emitting diodes of the respective colors being constituted by first and second light-emitting diodes having different chromaticities such that an average chromaticity of the first and second light-emitting diodes is a predetermined chromaticity and a wiring board on which a plurality of the light-emitting diode units are arranged at predetermined intervals in a first direction; and a housing to place a plurality of the light source apparatuses in a matrix in the first direction and a second direction which is nearly orthogonal to the first direction on a predetermined plane.

In this backlight apparatus, the respective light source apparatuses may each have first and second connectors provided at first and second positions, respectively, on the wiring board to electrically connect the respective light source apparatuses, the respective light source apparatuses being placed while being alternately inverted 180 degrees on the predetermined plane such that the first connector of one light source apparatus and the second connector of another light source apparatus which is adjacent to the one light source apparatus in the second direction face each other and the second connector of the one light source apparatus and the first connector of the other light source apparatus face each other, and the respective light-emitting diode units may be provided such that the respective first and second light-emitting diodes are arranged in a zigzag manner along the first direction.

Hence, by providing the respective light source apparatuses while alternately inverting them 180 degrees such that the above respective first and second connectors of adjacent light source apparatuses face each other, the shortest wiring can be made between the respective light source apparatuses, and by arranging the above respective first and second light-emitting diodes in the zigzag manner, the first light emitting diodes or the second light-emitting diodes can be prevented from being closely placed between different light source apparatuses even if the respective light source apparatuses are provided while being alternately inverted, which can suppress the occurrence of uneven color.

A backlight apparatus of another embodiment of the present invention includes: a light source apparatus having a light-emitting diode unit provided as one unit by nonlinearly and closely placing respective light-emitting diodes of red, green, and blue colors, at least the light-emitting diode of one color out of the light-emitting diodes of the respective colors being constituted by first and second light-emitting diodes having different luminances such that an average luminance of the first and second light-emitting diodes is a predetermined luminance, and a wiring board on which a plurality of the light-emitting diode units are arranged at predetermined intervals in a first direction; and a housing to place a plurality of the light source apparatuses in a matrix in the first direction and a second direction nearly orthogonal to the first direction on a predetermined plane.

In this backlight apparatus, the respective light source apparatuses each have first and second connectors provided at first and second positions, respectively, on the wiring board to electrically connect the respective light source apparatuses, the respective light source apparatuses being placed while being alternately inverted 180 degrees on the predetermined plane such that the first connector of one light source apparatus and the second connector of another light source apparatus which is adjacent to the one light source apparatus in the second direction face each other and the second connector of the one light source apparatus and the first connector of the other light source apparatus face each other, and the respective light-emitting diode units are provided such that the respective first and second light-emitting diodes are arranged in a zigzag manner along the first direction.

A backlight apparatus according to another embodiment of the present invention includes: a light source apparatus including a light-emitting diode unit provided as one unit by nonlinearly and closely placing respective light-emitting diodes of red, green, and blue colors, at least the light-emitting diode of one color out of the light-emitting diodes of the respective colors being constituted by first and second light-emitting diodes having different chromaticities and luminances such that an average chromaticity of the first and second light-emitting diodes is a predetermined chromaticity and an average luminance of the first and second light-emitting diodes is a predetermined luminance, and a wiring board on which a plurality of the light-emitting diode units are arranged at predetermined intervals in a first direction; and a housing to place a plurality of the light source apparatuses in a matrix in the first direction and a second direction nearly orthogonal to the first direction on a predetermined plane.

In this backlight apparatus, the respective light source apparatuses each have first and second connectors provided at first and second positions, respectively, on the wiring board to electrically connect the respective light source apparatuses, the respective light source apparatuses being placed while being alternately inverted 180 degrees on the predetermined plane such that the first connector of one light source apparatus and the second connector of another light source apparatus which is adjacent to the one light source apparatus in the second direction face each other and the second connector of the one light source apparatus and the first connector of the other light source apparatus face each other, and the respective light-emitting diode units are provided such that the respective first and second light-emitting diodes are arranged in a zigzag manner along the first direction.

A manufacturing method of a backlight apparatus according to an embodiment of the present invention includes the steps of: selecting first and second light-emitting diodes having different chromaticities for at least a light-emitting diode of one color out of respective light-emitting diodes of red, green, and blue colors such that an average chromaticity of the first and second light-emitting diodes is a predetermined chromaticity; constituting one light-emitting diode unit by nonlinearly and closely placing light-emitting diodes of the respective colors including the selected first and second light-emitting diodes and forming one light source apparatus by providing a plurality of the light-emitting diode units in a row in a first direction on a wiring board; and placing a plurality of the light source apparatuses in a matrix in the first direction and a second direction nearly orthogonal to the first direction on a predetermined plane in a housing.

A liquid crystal display apparatus according to an embodiment of the present invention includes: a backlight apparatus including a light source apparatus having a light-emitting diode unit provided as one unit by nonlinearly and closely placing respective light-emitting diodes of red, green, and blue colors, at least the light-emitting diode of one color out of the light-emitting diodes of the respective colors being constituted by first and second light-emitting diodes having different chromaticities such that an average chromaticity of the first and second light-emitting diodes is a predetermined chromaticity and a wiring board on which a plurality of the light-emitting diode units are arranged at predetermined intervals in a first direction, and a housing to place a plurality of the light source apparatuses in a matrix in the first direction and a second direction nearly orthogonal to the first direction on a predetermined plane; and a liquid crystal panel allowing a picture to be displayed by changing a transmittance of emitted light from the light-emitting diode unit.

A backlight apparatus according to still another embodiment of the present invention includes: a light source having a plurality of light-emitting diodes; a reflector plate provided so as to cover the light source, having opening portions to expose the respective light emitting diodes, and reflecting emitted light from the light-emitting diode; and a reflectivity lowering section provided at a peripheral edge portion of the reflector plate and allowing a reflectivity of the emitted light to be lowered.

This backlight apparatus is mounted in a liquid crystal display apparatus having a liquid crystal panel. In this liquid crystal display apparatus, in some cases, heat from the light-emitting diode is conducted to a peripheral edge portion of the liquid crystal panel via a housing or the like of the liquid crystal display apparatus, and thereby the temperature of the peripheral edge portion of the liquid crystal panel becomes higher than that of its central portion, which causes a temperature difference between the peripheral edge portion and the central portion. Due to the occurrence of this temperature difference, there occurs a phenomenon in which glass substrates between which liquid crystal is sealed are stressed, refractive indexes of the glass substrates change, and thereby the polarization property changes. Particularly in a black screen, the polarization property changes in a direction in which the black screen looks white, which causes uneven luminance. However, with the above structure, by providing the reflectivity lowering section at the peripheral edge portion of the reflector plate, this uneven luminance can be solved. The reflectivity lowing section is, for example, a black tape, black coating or black print processing, or the like.

A liquid crystal display apparatus according to another embodiment of the present invention includes: a backlight apparatus including a light source having a plurality of light-emitting diodes, a reflector plate provided so as to cover the light source, having opening portions to expose the respective light emitting diodes, and reflecting emitted light from the light-emitting diode, and a reflectivity lowering section provided at a peripheral edge portion of the reflector plate and allowing a reflectivity of the emitted light to be lowered; and a liquid crystal panel allowing a picture to be displayed by changing a transmittance of the emitted light reflected by the reflector plate.

As described above, according to the embodiments of the present invention, by increasing the flexibility of selection of LEDs of respective colors, chromaticity and luminance uniformities can be increased.

BRIEF DESCRIPTION OF DRAWINGS

FIG. 5 is a table showing a state in which LEDs of respective colors are sorted out according to chromaticity and luminance parameters to form a matrix in the embodiment of the present invention;

FIGS. 11A to 11C are diagrams showing simulation results of affixing the three patterns of black tapes in FIGS. 10A to 10C to the reflector plate and measuring the luminance of a liquid crystal panel.

DESCRIPTION OF PREFERRED EMBODIMENTS

An embodiment of the present invention will be described below with reference to the drawings.

Figure 1:
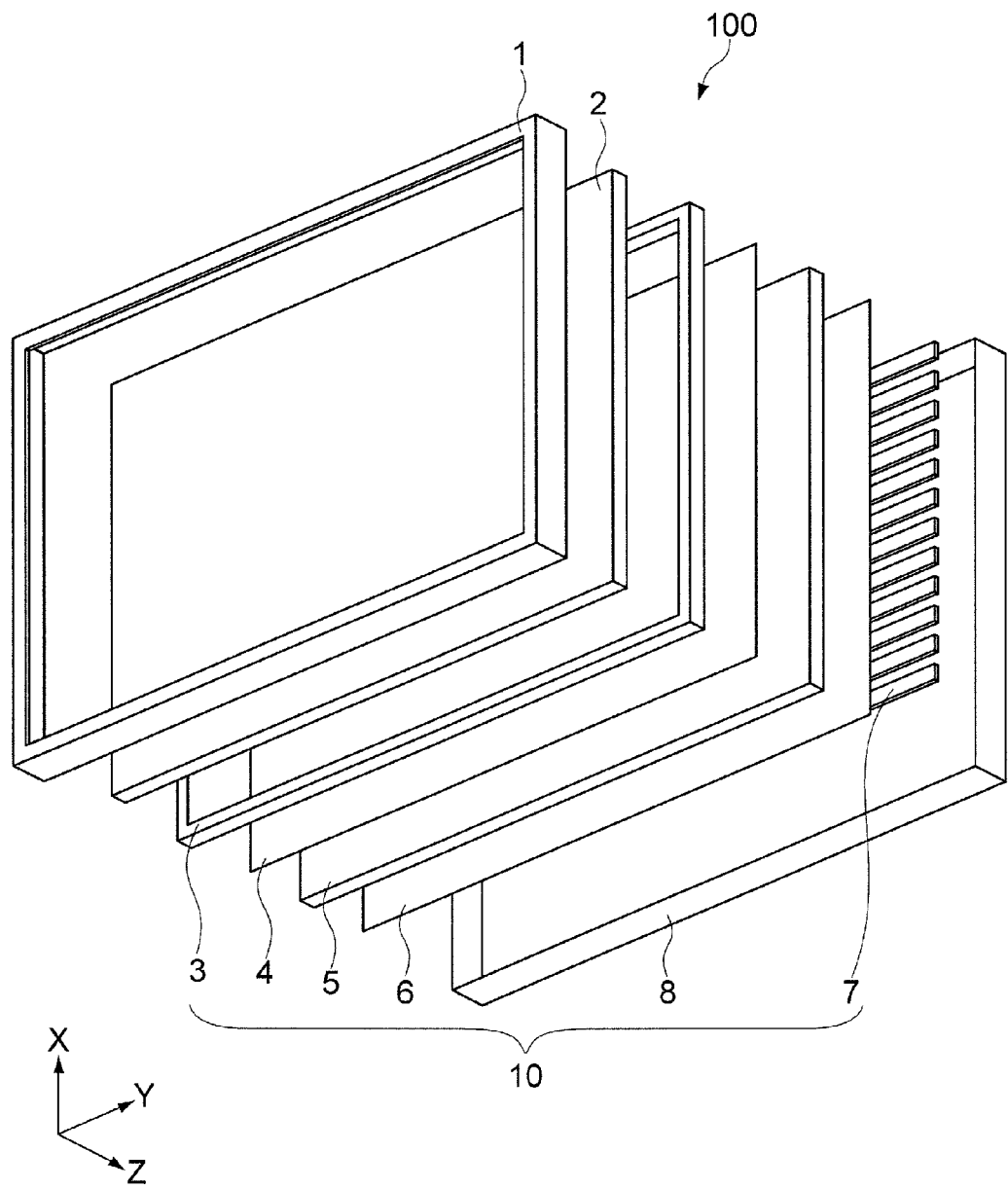
FIG. 1 is a schematic exploded perspective view of a liquid crystal display apparatus including a backlight apparatus according to an embodiment of the present invention.
Figure 2:
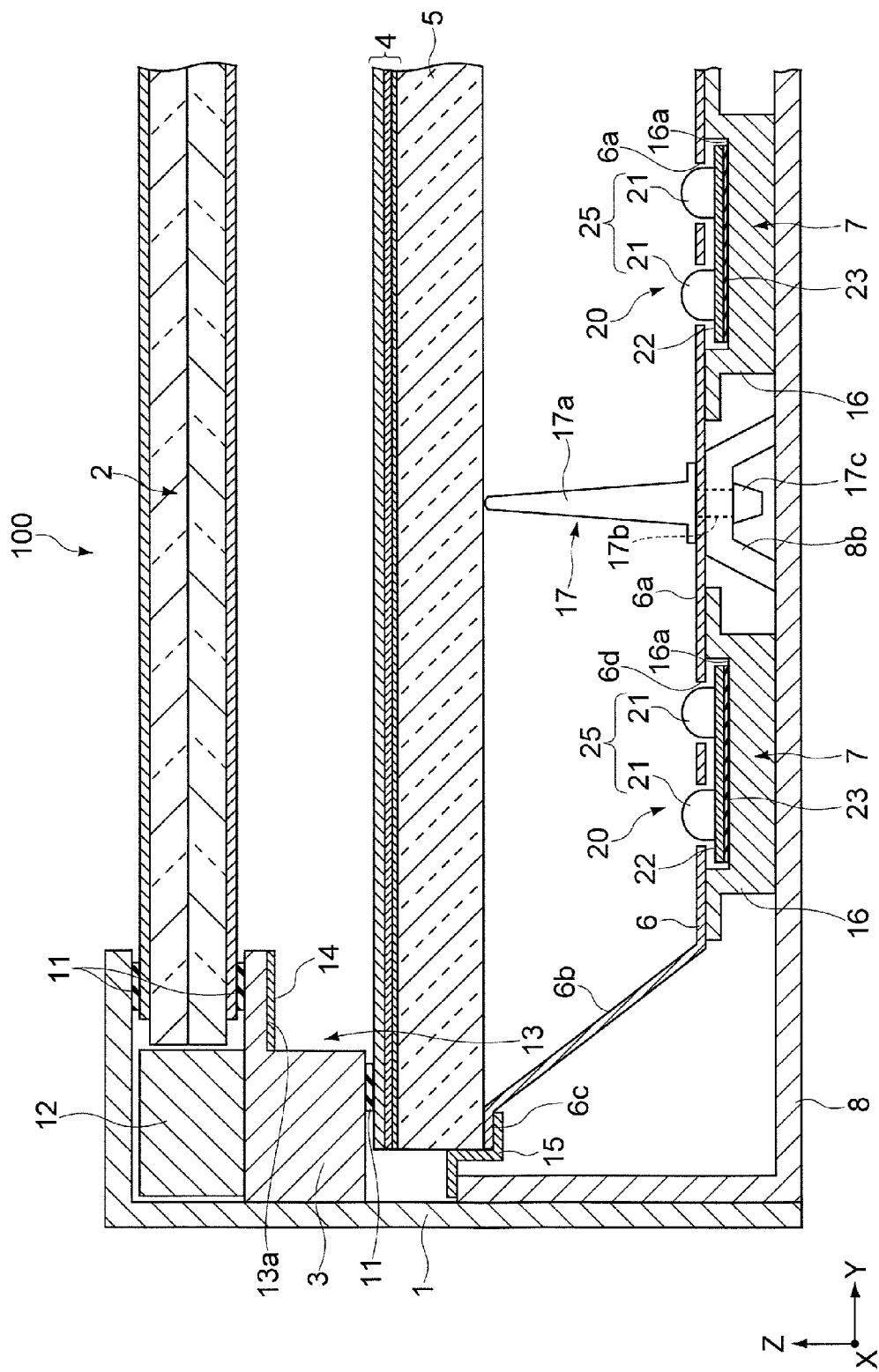
FIG. 2 is a partial sectional view in a Z direction of the liquid crystal display apparatus shown in FIG. 1.
Figure 3:
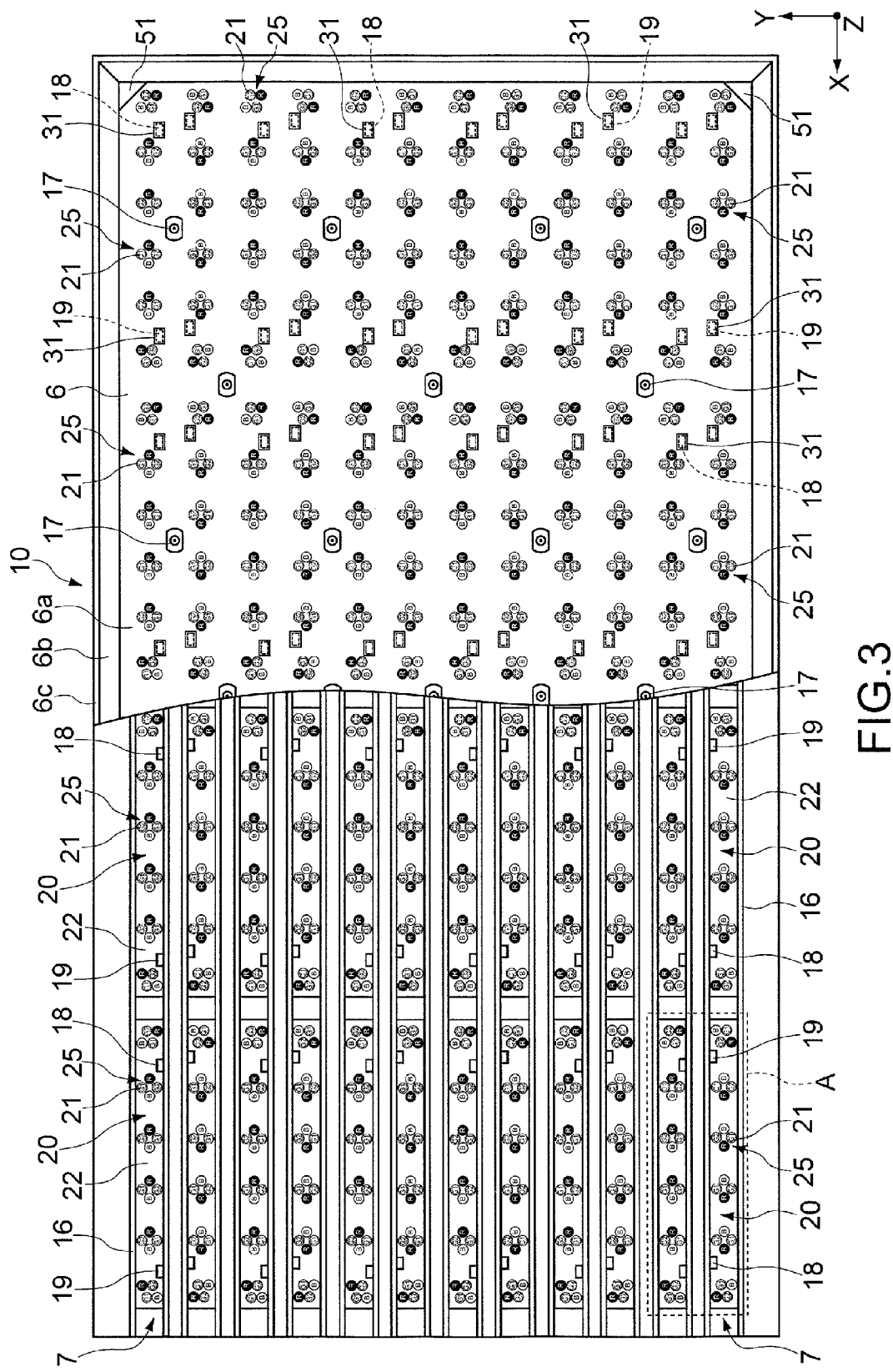
FIG. 3 is a partial cutaway plan view showing the structure of the backlight apparatus according to the embodiment of the present invention.

FIG. 1 is a schematic exploded perspective view of a liquid crystal display apparatus including a backlight apparatus according to the embodiment of the present invention. FIG. 2 is a partial sectional view in a Z direction of the liquid crystal display apparatus shown in FIG. 1. FIG. 3 is a partial cutaway plan view showing the structure of the backlight apparatus of the liquid crystal display apparatus shown in FIG. 1 and FIG. 2.

This liquid crystal display apparatus is used, for example, for a display panel of a television receiver having a large display screen of 40 inches or more, and is a transmissive liquid crystal display apparatus which displays an image by illuminating a liquid crystal panel from the back surface side with the backlight apparatus.

As shown in FIG. 1 and FIG. 2, a liquid crystal display apparatus 100 is constituted by sandwiching and holding a liquid crystal panel 2, a middle frame 3, an optical sheet laminated body 4, a diffuser plate 5, a reflector plate 6, and light source arrays 7 between a front chassis 1 and a back chassis 8. The front chassis 1, the middle frame 3, and the back chassis 8 are made of metal such as aluminum. The optical sheet laminated body 4, the diffuser plate 5, the reflector plate 6, the light source arrays 7, and the back chassis 8 form a backlight apparatus 10, which supplies display light from the back surface side of the liquid crystal panel 2.

As shown in FIG. 2, the liquid crystal panel 2 is held with its outer peripheral edge portion between the front chassis 1 and the middle frame 3, for example, through spacers 11, a guide member 12, and the like. Although details are omitted, the light transmittance of the liquid crystal panel 2 is changed by sealing liquid crystal between a first glass substrate and a second glass substrate and applying a voltage to this liquid crystal to change the orientation of liquid crystal molecules. A striped transparent electrode, an insulating film, and an alignment film are formed on an inner surface of the first glass substrate, and color filters of light's three primary colors of red, green, and blue (RGB), an over coat layer, a striped transparent electrode, and an alignment film are formed on an inner surface of the second glass substrate. A polarizing film and a phase difference film are joined to each of the surfaces of both the glass substrates.

In the liquid crystal panel 2, the alignment film made of polyimide is arranged in a horizontal direction (in X and Y directions in FIG. 1 and FIG. 2) with the liquid crystal molecules as an interface, and the polarizing film and the phase difference film provide an achromatic and white wavelength characteristics in order to display an image with full-color representation by the color filters. It is noted that the liquid crystal panel 2 is not limited to such a structure, and liquid crystal panels with various configurations existing in the past can be used.

The optical sheet laminated body 4 and the diffuser plate 5 are held so as to be sandwiched between the middle frame 3 and a bracket member 15 attached to the back chassis 8 while both being stacked. The spacer 11, for example, is inserted between the middle frame 3 and the optical sheet laminated body 4. An edge portion 6c of the reflector plate 6 described later is inserted between the bracket member 15 and the diffuser plate 5.

Although details are omitted, the optical sheet laminated body 4 is constituted by laminating a plurality of optical functional sheets fulfilling predetermined optical functions such as a polarization converting sheet to decompose the display light emitted from the light source arrays 7 side and supplied to the liquid crystal panel 2 into orthogonal polarization components, a phase difference sheet (film) to compensate for a phase difference between light waves to realize a wider viewing angle and prevent coloring, a diffusion sheet to diffuse the display light to make luminance uniform, and a prism sheet.

As well as reflecting part of the display light which has entered from one principal surface side (light source arrays 7 side) toward the light source arrays 7 side, the diffuser plate 5 transmits part of the display light and diffuses it by refracting and reflecting it therein to allow it to enter the optical sheet laminated body 4 in a uniform state over the whole surface from the other principal surface side.

Meanwhile, in the liquid crystal display apparatus 100, for example, when a user observes a peripheral edge portion of the liquid crystal panel 2 from an oblique direction, it is necessary to make an illumination region of the backlight apparatus 10 larger than a principal surface region of the liquid crystal panel 2 in order to meet a change in an observation angle of the user with respect to a principal surface of the liquid crystal panel 2. As in the liquid crystal display apparatus 100 of this embodiment, the larger the display screen, the higher this necessity becomes. Therefore, the above middle frame 3 is provided with a step portion 13 so that illumination light of the backlight apparatus 10 can be obtained even if the user observes the liquid crystal panel 2 from any angle. Incidentally, instead of a stepped shape, a tapered shape from the liquid crystal panel 2 side to the optical sheet laminated body 4 side is also suitable.

However, in this step portion 13, a step surface 13a nearly parallel to the principal surface of the liquid crystal panel 2 is formed, and hence in some cases, light emitted from the backlight apparatus 10 via the diffuser plate 5 and the optical sheet laminated body 4 is reflected by this step surface 13a and this reflected light strikes the optical sheet laminated body 4, thereby causing halation (picture frame-shaped reflection). Such halation causes a display of an unnatural image and lowers the quality of the liquid crystal display apparatus. Hence, in this embodiment, a matte black tape 14 is affixed to the above step surface 13a. Consequently, the light which has entered the step portion 13 from the optical sheet laminated body 4 is absorbed by the black tape 14, so that the high-quality liquid crystal display apparatus 100 which causes no halation can be provided.

Incidentally, instead of affixing the black tape, the middle frame 3 may be coated black. In this embodiment, the middle frame 3 is made of aluminum, and therefore has only to be black anodized. Further, in this embodiment, the middle frame 3 is made of metal (made of aluminum) in consideration of the influence of strength, thermal expansion rate difference, and so on, but the middle frame 3 itself may be formed of black resin if their influence can be solved.

As shown in FIG. 3, the light source array 7 has a long ruler shape extending in a horizontal direction (X direction in FIG. 3), and a plurality of rows of light source arrays 7 are arranged at predetermined intervals along a Y direction in FIG. 3 on a bottom surface of the back chassis 8. In this embodiment, 12 rows of light source arrays 7 are provided, but the number of rows is, of course, not limited to this number. Incidentally, FIG. 3 shows a state in which the middle frame 3, the optical sheet laminated body 4, and the diffuser plate 5 are omitted from the backlight apparatus 10.

As shown in FIG. 2 and FIG. 3, each of the light source arrays 7 includes an array base 16 made of metal and a plurality of light source apparatuses 20 arranged in a recessed portion 16a of this array base 16. The number of light source apparatuses 20 arranged in one array base 16 is, for example, four, but not limited to this number. The light source array 7 is fixed to the bottom surface of the back chassis 8 by fastening the light source apparatuses 20, the array base 16, and the back chassis 8, for example, with screws.

Each of the light source apparatuses 20 includes a wiring board 22, a plurality of LED units 25 mounted on this wiring board 22, an input connector 18, and an output connector 19. As a material for the wiring board 22, resin such as a glass epoxy resin is used instead of metal such as aluminum in order to reduce costs.

As shown in FIG. 3, each of the LED units 25 is constituted by placing a plurality of LEDs 21 as one unit closely and nonlinearly (in a cross shape), and one light source apparatus 20 is provided with a plurality of LED units 25. More specifically, one LED unit 25 includes, for example, a total of four LEDs 21 of one red LED, one blue LED, and two green LEDs, and, for example, six LED units 25 are arranged at predetermined intervals (for example, at intervals of 60 mm) in a longitudinal direction (X direction) on the wiring board 22 of the one light source apparatus 20. Accordingly, in the backlight apparatus 10 of this embodiment, 6×4×12=288 LED units 25 are provided, and 4×288=1152 LEDs 21 are provided. Incidentally, the numbers and arrangement intervals of LED units 25 and LEDs 21 are not limited to those described above or shown, and can be changed appropriately according to the size of the liquid crystal panel 2, the light-emitting capability of the LED 21, and so on. Details of a combination of LEDs 21 of respective colors in each LED unit 25 will be described later.

Although details are omitted, each LED 21 is constituted, for example, by holding a light-emitting portion by a resin holder and drawing out a pair of terminals from the resin holder. A so-called side-emission type LED having a directivity of emitting main components of emitted light in an outer peripheral direction of the light-emitting portion is used as each LED 21.

The wiring boards 22 of the respective light source apparatuses 20 are all formed with the same specification, and although not shown, on each wiring board 22, a wiring pattern to connect the LEDs 21 of respective colors of the respective LED units 25 in series, a land to connect terminals of the respective LEDs 21, and the like are formed. Further, a thermal via pierced in a Z direction is provided in a portion located below each LED 21 of each wiring board 22. This thermal via makes it possible to conduct heat generated from each LED 21 to the array base 16 and release the heat. Furthermore, on each wiring board 22, the input connector 18 is mounted at one side portion in a short side direction (Y direction) and an end portion on one side in a longitudinal direction (X direction), and the output connector 19 is mounted at an end portion on the other side.

As described above, in each light source array 7, respective light source apparatuses 20 are formed with the wiring boards 22 being arranged in the same direction on respective array bases 16. Further, in the light source arrays 7 of odd-numbered rows including the first, third, fifth, . . . , and eleventh rows out of the respective light source arrays 7, respective light source apparatuses 20 are arranged so that the one side portion of each of the wiring boards 22 at which the input connector 18 and the output connector 19 are mounted is placed on the lower side. On the other hand, in the light source arrays 7 of even-numbered rows including the second, fourth, sixth, . . . , and twelfth rows, respective light source apparatuses 20 are arranged so that the one side portion of each of the wiring boards 22 at which the input connector 18 and the output connector 19 are mounted is placed on the upper side.

Namely, the respective light source arrays 7 are provided such that with respect to one light source 20, another light source apparatus 20 adjacent thereto in the Y direction is provided while being inverted 180 degrees in an XY plane. Accordingly, the input connector 18 of the one light source apparatus 20 and the output connector 19 of the other light source apparatus 20 adjacent thereto in the Y direction face each other, and the output connector 19 of the one light source apparatus 20 and the input connector 18 of the other light source apparatus 20 face each other. This enables the shortest wiring between the light source apparatuses 20 of different rows.

Incidentally, an adhesive material 23 is provided between the wiring board 22 and the array base 16, and by pressing the wiring board 22 with a specified load to the array base 16 side via the adhesive material 23, both are fixed. A material which is an insulator and has a high thermal conductivity is used as this adhesive material 23. As this adhesive material 23, an insulator with adherence may be used or an insulator with no adherence with both surfaces coated with an adhesive material may be used. As described above, the thermal via to conduct heat from the LED 21 is provided in the wiring board 22, and this thermal via is made conductive by copper plating or the like and the array base 16 is a conductor. Therefore, an insulator is necessary between the wiring board 22 and the array base 16. The use of the above adhesive material 23 makes it possible to reduce temperature differences among respective LEDs 21 while keeping the insulating properties, conducting heat generated from the LEDs 21 to the array base 16 evenly and uniformly, and efficiently releasing the heat. Further, such a structure can be realized at low cost. Furthermore, it is unnecessary to fasten the wiring board 22 and the array base 16 with a screw, which can reduce man-hours in manufacturing.

As shown in FIG. 2 and FIG. 3, the reflector plate 6 is provided above the respective light source arrays 7 (in the Z direction) so as to cover all the light source arrays 7. The reflector plate 6 includes a plane portion 6a, an edge portion 6c formed nearly parallel to this plane portion 6a at a peripheral edge of the reflector plate 6, and a slope portion 6b formed between the plane portion 6a and the edge portion 6c (around the plane portion 6a) from the diffuser plate 5 side to the light source apparatus 20 side. In the plane portion 6a, a plurality of (1152) circular openings 6d are provided to match the number and shape of respective LEDs of the respective LED units 25, and the reflector plate 6 is provided such that the plane portion 6a is fixed to upper surfaces of the array bases 16 of the respective light source arrays 7, for example, by adhesive bonding with the respective LEDs 21 penetrating from the openings 6d. Each opening 6d is formed slightly larger than the size of the outer periphery of each LED 21 to accommodate variations in size tolerance and the like. This makes it possible to easily attach the reflector plate 6. Further, as described above, the reflector plate 6 is held by inserting the edge portion 6c between the diffuser plate 5 and the bracket member 15 provided at the back chassis 8. Further, the reflector plate 6 is also held by optical studs 17 described later.

This reflector plate 6 is formed by using, for example, an aluminum plate or a stainless plate as a base material and joining a reflective member made of foamed PET (polyethylene terephthalate) containing a fluorescent material or the like to the surface of the base material. Out of light emitted from each LED unit 25 of the light source apparatus 20, light reflected by the above diffuser plate 5 is reflected by this reflector plate 6 and enters again the diffuser plate 5. By repeatedly reflecting emitted light from the LED 21 of each color between the diffuser plate 5 and the reflector plate 6, improvements in reflectivity and color mixture owing to an increased reflection principle is realized.

Further, the surface of each wiring board 22 is coated with a while solder resist. Wiring boards in the past are generally coated with a green or yellow solder resist. However, as described above, each opening 6d provided in the above reflector plate 6 is formed slightly larger than the size of the outer periphery of each LED 21. Therefore, if light reflected from the diffuser plate 5 to the reflector plate 6 side enters a clearance between the LED 21 and the opening 6d, this light is absorbed in the case of the green or yellow wiring board in the past, resulting in a loss of light from the LED 21. Hence, in this embodiment, the wiring board 22 is coated with the white solder resist, so that even if light enters the clearance between the LED 21 and the opening 6d, the light is reflected by the wiring board 22, which minimizes uneven luminance due to the loss of light.

The white solder resist contains a high light reflective material which efficiently reflects light. As the high light reflective material, for example, a fine inorganic material such as titanium oxide ($TiO_2$) or barium sulfate ($BaTiO_3$), a fine organic material such as porous acrylic or polycarbonate having innumerable holes for light scattering is suitably used.

Moreover, a plurality of optical studs 17 are provided between the diffuser plate 5 and the reflector plate 6. As shown in FIG. 2, the optical stud 17 includes a projecting portion 17a, a base portion 17c, and a shaft portion 17b connecting the above portions and is fixed, for example, such that the shaft portion 17b penetrates through a recessed portion 8b of the back chassis 8 and a fitting hole (not shown) provided in the reflector plate 6 and the recessed portion 8b and the reflector plate 6 are sandwiched between the projecting portion 17a and the base portion 17c. The optical stud 17 is integrally molded by a milky white synthetic resin material such as a polycarbonate resin having a light guiding property, mechanical stiffness, and a certain degree of elasticity. By providing the optical stud 17, a bottom surface of the diffuser plate 5 is held so as to be touched by a tip of the projecting portion 17a of the optical stud 17, so that the distance between the diffuser plate 5 and the reflector plate 6 is held, which prevents the occurrence of uneven color and the like due to deflection and the like of the diffuser plate 5 and the reflector plate 6.

As shown in FIG. 3, a plurality of optical studs 17 are provided over the whole surface of the backlight apparatus 10. For example, three or four optical studs 17 are provided at predetermined intervals in the Y direction every time the LED units 25 of three columns are provided, five optical studs 17 are provided at predetermined intervals in the Y direction in a central portion of the backlight apparatus 10, and a total of 27 optical studs 17 are provided in the whole backlight apparatus 10. This number can, of course, be changed appropriately. Further, this optical stud 17 is provided at a position almost equally distant from four LED units 25 adjacent to one another. If the optical stud 17 is provided at a middle position between two LED units 25 adjacent in the X direction or the Y direction, color mixture of respective emitted lights between the two LED units 25 is hindered by the optical stud 17, which causes uneven color and uneven luminance of any of red, blue, and green colors. However, in this embodiment, by providing the optical stud 17 roughly in the center of four LED units 25 as described above, the above occurrence of uneven color and uneven luminance can be suppressed, so that the high-quality liquid crystal display apparatus can be provided.

As described above, the reflector plate 6 is provided in such a manner that the LEDs 21 penetrate through the openings 6d, but this causes the interference between the input connector 18 and the output connector 19 provided on each wiring board 22 and the reflector plate 6, so that it is necessary to also provide openings (not shown) to allow these input connector 18 and output connector 19 to penetrate through in the reflector plate 6. Namely, the input connector 18 and the output connector 19 are exposed on the surface of the reflector plate 6. However, when light emitted from the LED 21 strikes this opening portion, the input connector 18, and the output connector 19, the light is lost without being reflected to the diffuser plate 5 side, resulting in a reduction in the luminance of the backlight apparatus 10 and the occurrence of local uneven luminance.

Hence, in this embodiment, as shown in FIG. 3, reflective sheets 31 are affixed to the reflector plate 6 so as to cover the exposed input connectors 18 and output connectors 19. As with the reflector plate 6, this reflective sheet 31 is made of a reflective material such as formed PET. This makes it possible to provide the backlight apparatus 10 having a high luminance, a little uneven luminance, and no loss of light even when it is necessary to provide the openings for the input connectors 18 and the output connectors 19 in the reflector plate 6.

Moreover, in addition to the connectors, a screw to fix the light source apparatus 20 to the back chassis 8 is also provided on the wiring board 22, and it is necessary to provide an opening for this screw in the reflector plate 6. This also causes a problem of a loss of light. Hence, as with the above reflective sheet 31, a reflective sheet (not shown) to cover the screw may be provided on the reflector plate 6.

Incidentally, instead of providing the above reflective sheets 31, a highly reflective material may be used for the input connector 18, the output connector 19, and the screw, themselves. Further, instead of providing the reflective sheets 31, it is also possible to reduce gaps between the input connector 18 and the output connector 19 and the openings to a minimum, and when the input connector 18, the output connector 19, and their wirings interfere with the reflector place 6, to make a flap (cut) in the reflector plate 6 and allow this flap portion to reflect light while preventing the interference by lifting the flap portion, thereby preventing the loss of light.

Meanwhile, if the LED units 25 continue to be lit when the LED units 25 are used as a light source of the backlight apparatus 10 as in this embodiment, the temperature of the back chassis 8 or the like of the light source apparatuses 20 increases, for example, by about 30° C. with respect to room temperature as time goes by. Following this, the temperature of the liquid crystal panel 2 also increases, for example, by about 20° C. with respect to room temperature via the front chassis 1, the middle frame 3, and so on. As a result, a difference in temperature occurs between the peripheral edge portion of the liquid crystal panel 2 held by the front chassis 1 and the middle frame 3 and a central portion of the liquid crystal panel 2 distant from this peripheral edge portion. Consequently, there occurs a phenomenon in which the glass substrates between which liquid crystal is sealed are stressed, refractive indexes of the glass substrates change, and thereby the polarization property changes. Particularly in a black screen, the polarization property changes in a direction in which the black screen looks white, which causes uneven luminance.

Hence, in this embodiment, as shown in FIG. 3, a black tape 51 is affixed to each of four corners of the reflector plate 6 to lower the reflectivity at four corners of the reflector plate 6, leading to an improvement in uneven luminance.

Figure 10A:
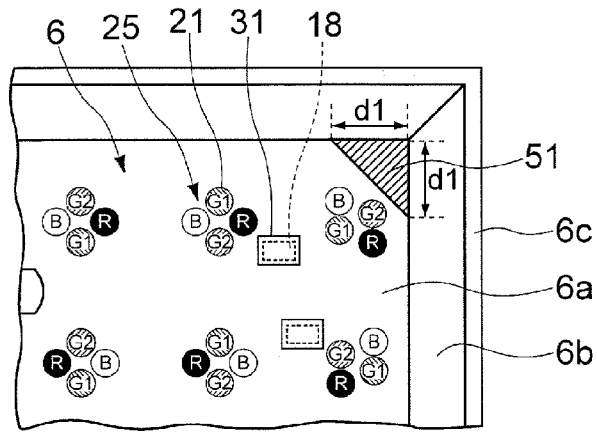
FIGS. 10A to 10C are views showing three patterns when a black tape is provided on a reflector plate in the embodiment of the present invention.
Figure 10B:
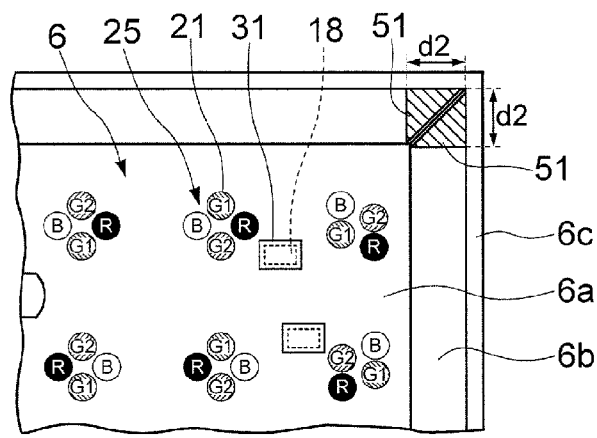
Figure 10C:
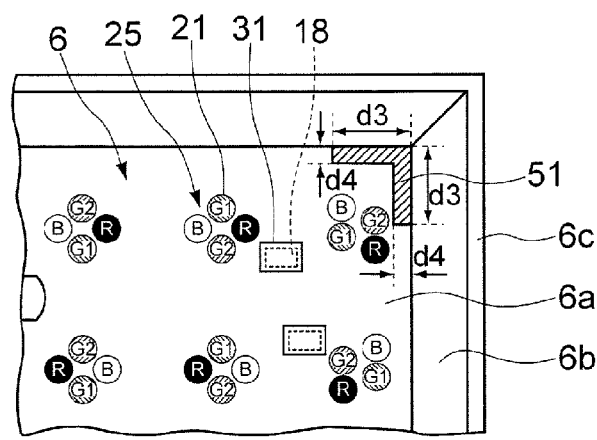

The present inventor et al. assume three patterns regarding the position and shape when the black tape 51 is provided and perform simulation. FIGS. 10A to 10C are views showing three patterns when the black tape 51 is provided. Incidentally, in FIGS. 10A to 10C, for convenience of description, only an upper-right corner portion of the backlight apparatus 10 shown in FIG. 3 is shown, but the black tape 51 is provided not only at this upper-right corner but also at each of four corners.

FIG. 10A shows an example in which one black tape 51 in an isosceles triangle shape is affixed to each of four corners of the plane portion 6a of the reflector plate 6. A length d1 of two equal sides is, for example, 60 mm, but not limited to this length.

FIG. 10B shows an example in which two black tapes 51 in the same isosceles triangle shape are affixed to each of four corners of the slope portion 6b of the reflector plate 6. At each of the four corners of the slope portion 6b, these two black tapes 51 are provided on a surface along the X direction and a surface along the Y direction of the slope portion 6b symmetrically with respect to an edge portion common to the respective surfaces. A length d2 of two equal sides is, for example, 35 mm, but not limited to this length, and can be changed appropriately according to the width of the slope portion 6b.

FIG. 10C shows an example in which one black tape 51 in an L-shape (figure formed by overlapping end portions of two nearly orthogonal heavy-line rectangles) is affixed to each of the four corners of the plane portion 6a of the reflector plate 6. A length d3 in a longitudinal direction of each of the overlapped rectangles is, for example, 60 mm and a length d4 in a short side direction is, for example, 15 mm, but they are not limited to these lengths.

FIGS. 11A to 11C are diagrams showing simulation results of affixing the above three patterns of black tapes to the reflector plate 6 and measuring the luminance of the liquid crystal panel 2. Incidentally, the patterns shown in FIG. 10A to FIG. 10C are called a pattern (a), a pattern (b), and a pattern (c), respectively. Further, in this simulation, in the above plan view of FIG. 3, the black tape 51 of the pattern (a), the black tape 51 of the pattern (b), and the black tape 51 of the pattern (c) are affixed to an upper left corner, an upper right corner, and a lower right corner of the reflector plate 6, respectively, and the black tape 51 is not affixed to a lower left corner, so that regarding the three patterns, luminances can be measured in one backlight apparatus 10 at one time.

FIG. 11A shows simulation results when the black tape 51 is not affixed and the black tape 51 of the pattern (b) is affixed, and FIG. 11B shows simulation results when the black tapes 51 of the pattern (a) and the pattern (c) are affixed. In FIGS. 11A and 11B, the vertical axis represents the luminance, and the horizontal axis represents, with the center of the liquid crystal panel 2 as a reference (0), the relative distance on a diagonal line from this center to one corner of the liquid crystal panel 2. Further, the dotted line shows a case where the black tape 51 is not affixed, and the solid line shows a case where the black tape 51 is affixed. FIG. 11C shows the results of FIGS. 11A and 11B in tabular form.

As shown by portions surrounded by oval dotted lines in FIGS. 11A and 11B and shown in FIG. 11C, the luminance of each corner can be reduced by up to 16% in the case of the pattern (a), reduced by up to 30% in the case of the pattern (b), and reduced by up to 11% in the case of the pattern (c).

Figure 12C:
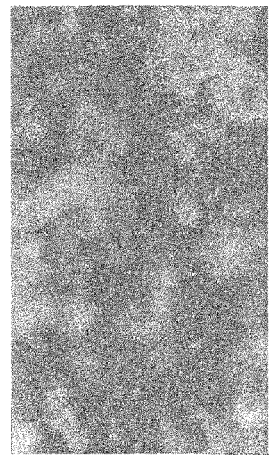
FIGS. 12A to 12F are views showing states in which the chromaticity of the liquid crystal panel is measured under the same conditions as in the simulation of FIGS. 11A to 11C.
Figure 12B:
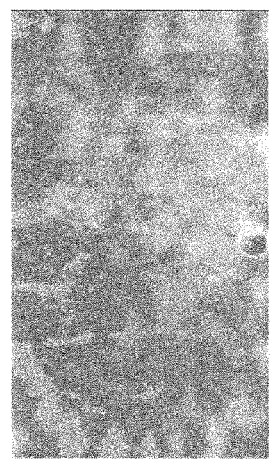
Figure 12A:
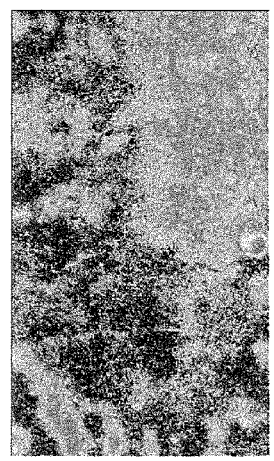
Figure 12F:
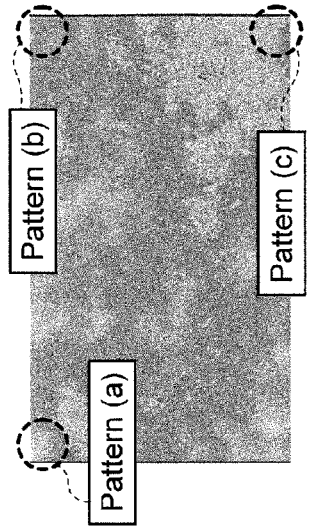
Figure 12E:
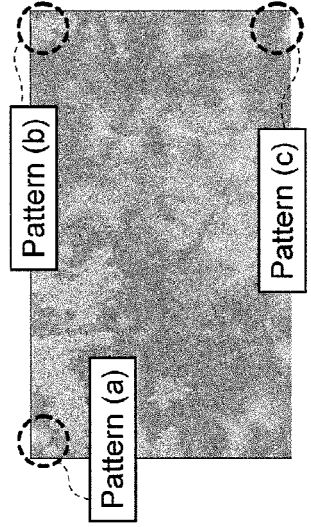
Figure 12D:
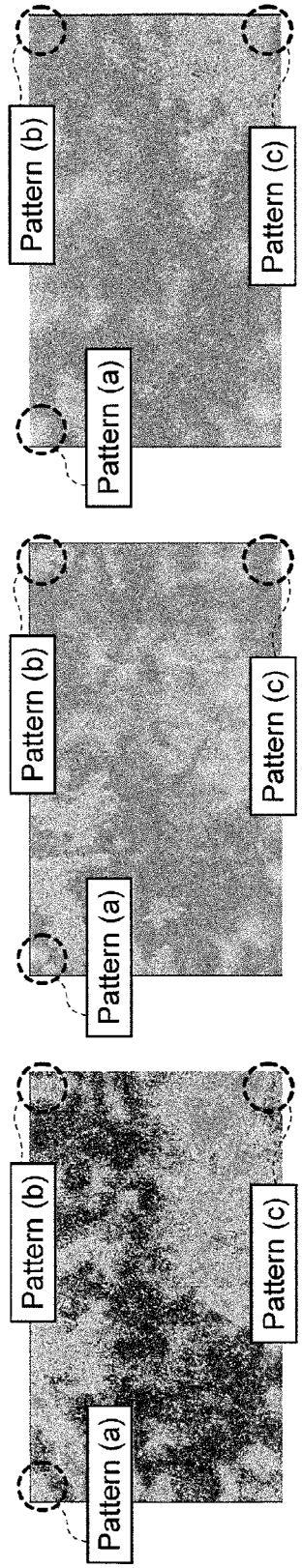

FIGS. 12A to 12F are views showing states in which the chromaticity of the liquid crystal panel 2 is measured under the same conditions as in the simulation in FIGS. 11A to 11C. FIGS. 12A to 12C show a color difference distribution, a chromaticity Cx distribution, and a chromaticity Cy distribution of the liquid crystal panel 2 when the black tape 51 is not affixed, and FIGS. 12D to 12F show a color difference distribution, a chromaticity Cx distribution, and a chromaticity Cy distribution of the liquid crystal panel 2 when the black tape 51 is affixed. In FIGS. 12D to 12F, portions surrounded by circle dotted lines correspond to portions where the black tapes 51 of the respective patterns are affixed to the reflector plate 6.

As shown in these figures, it can be seen that even when the black tape 51 of any pattern is affixed, regarding the chromaticity, nearly the same effect can be obtained regardless of the presence or absence of the black tape 51, and there is no change in the chromaticity according to the presence or absence of the black tape 51.

As described above, in this embodiment, by affixing the black tapes 51 to the peripheral edge portion (four corners) of the reflector plate 6, the luminance of the peripheral portion of the liquid crystal panel 2 can be reduced by 0% to about 30% without reducing the chromaticity of the liquid crystal panel 2. Accordingly, by appropriately changing the pattern of the black tape 51 according to the specifications of the backlight apparatus 10, the liquid crystal display apparatus 100, and so on, the luminance can be controlled appropriately.

Incidentally, in this embodiment, the example in which the black tapes 51 are affixed is shown, but without being limited to this example, black coating or black print processing may be performed instead of affixing the black tapes 51. Namely, it is only necessary to perform processing to reduce the reflectivity at four corners of the reflector plate 6.

Figure 4:
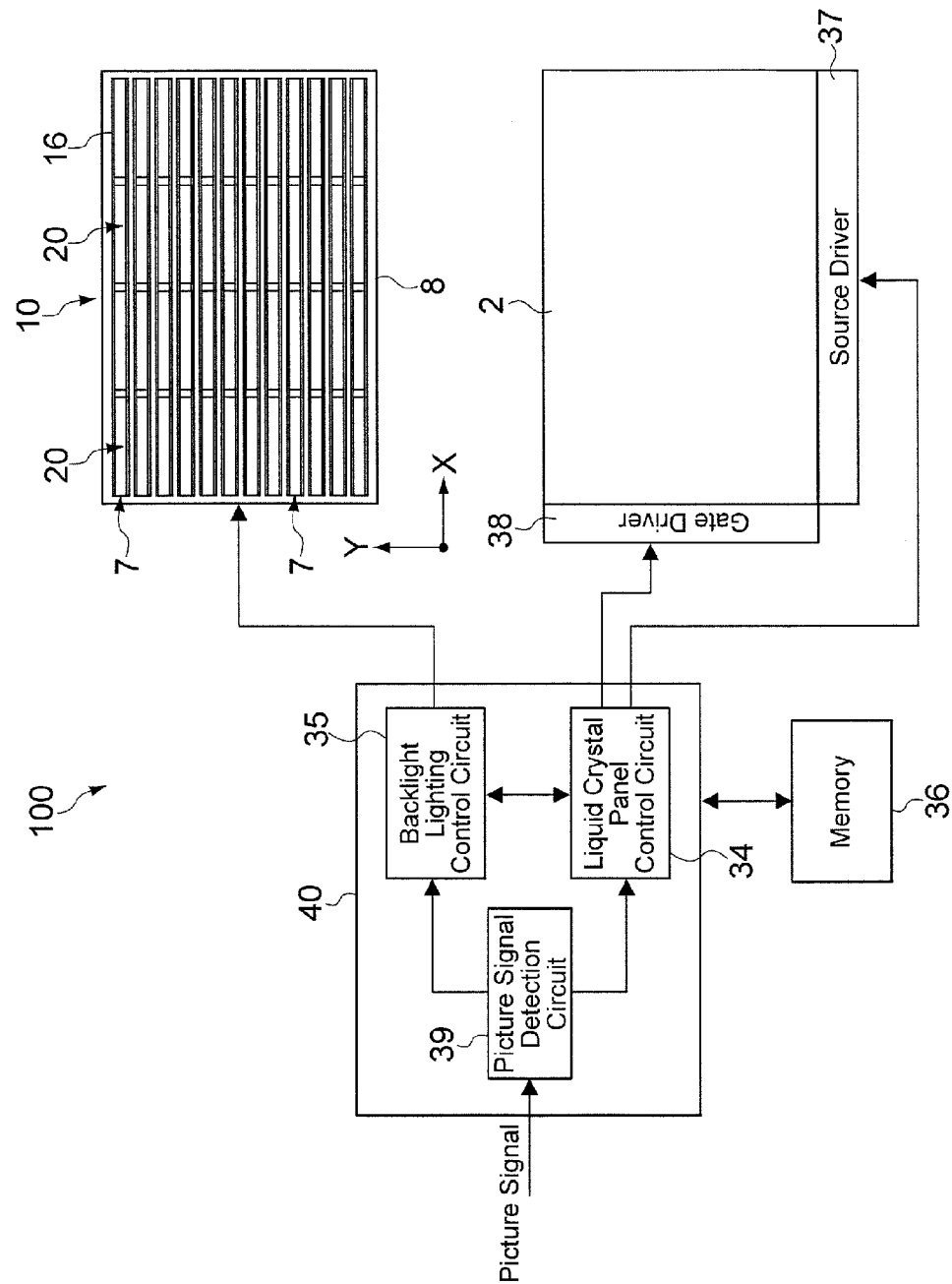
FIG. 4 is a block diagram showing a drive circuit of the liquid crystal display apparatus in the embodiment of the present invention.

Next, a drive circuit of the above liquid crystal display apparatus 100 will be described in brief. FIG. 4 is a block diagram showing the drive circuit.

As shown in FIG. 4, the liquid crystal display apparatus 100 includes the above liquid crystal panel 2 to display a picture, the backlight apparatus 10 placed on the back surface side of the liquid crystal panel 2, a control unit 40 performing various controls on the backlight apparatus 10 and the liquid crystal panel 2, and a memory 36 accessible by the control unit 40. The control unit 40 includes a picture signal detection circuit 39 detecting a picture signal, a backlight lighting control circuit 35 controlling lighting of the backlight apparatus 10, and a liquid crystal panel control circuit 34 controlling driving of the liquid crystal panel 2.

The liquid crystal panel 2 has a source driver 37 and a gate driver 38 to send a drive signal to the liquid crystal panel 2. Further, as described above, the color filters of the three primary colors (RGB) (not shown) are mounted on the liquid crystal panel 2, and one pixel is constituted by three subpixels corresponding to three RGB colors. The color filters may be of four or more primary colors including a color other than RGB, for example, emerald, cyan, or the like.

The picture signal detected by the picture signal detection circuit 39 is supplied to the source driver 37 and the gate driver 38 at a predetermined timing via the memory 36 by the liquid crystal panel control circuit 34, and a picture is displayed by the liquid crystal panel 2 being driven by control of both the drivers. On the other hand, the backlight lighting control circuit 35 generates a backlight lighting signal and drives each LED 21 of each light source apparatus 20 of the backlight apparatus 10.

Next, the combination and arrangement of the LEDs 21 of respective colors in each LED unit 25 of the above light source apparatus 20 will be described. It is desirable that the chromaticities and luminances of the LEDs 21 of respective colors be all uniform on a color-by-color basis, but in many cases, there are variations in chromaticity and luminance among the LEDs 21. Hence, in mixing lights of the LEDs 21 of respective colors in one LED unit 25, the use of a combination of a plurality of LEDs 21 having different chromaticities and luminances is considered.

The present inventor et al. sort out the LEDs 21 of respective colors of red, green, and blue according to two parameters of chromaticity and luminance, and first form a matrix such as shown in FIG. 5. Namely, as shown in FIG. 5, the matrix is formed by sorting the LEDs 21 of each color into three levels of chromaticities and five levels of luminances, and in each color, 15 kinds of LEDs 21 different in chromaticity and luminance are assumed. Incidentally, hereinafter, each level (width) of chromaticity and luminance is called "bin".

Figures 6A, 6B:
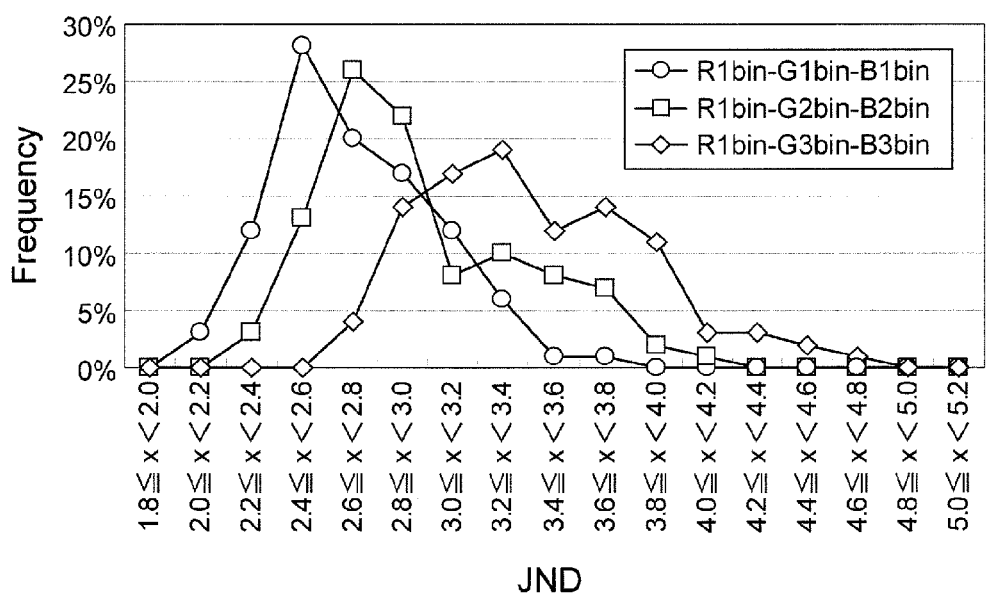
FIGS. 6A and 6B are diagrams showing simulation results of combinations of LEDs of respective bins of the backlight apparatus in the embodiment of the present invention.

Then, using a plurality of bins of LEDs 21 with a fixed luminance and different chromaticities out of the LEDs 21 in this matrix, the number of bins of LEDs 21 of each color is simulated. FIGS. 6A and 6B are diagrams showing results of this simulation.

Namely, as shown in FIG. 6A, JNDs (Just Noticeable Differences) of uneven color of the liquid crystal panel 2 when the liquid crystal display apparatus 100 is driven in cases where in one LED unit 25, the number of bins of the respective LEDs 21 of red (R), green (G), and blue (B) colors in the above matrix is R:G:B=1bin:1bin:1bin, R:G:B=1bin:2bin:2bin, and R:G:B=1bin:3bin:3bin are measured, respectively. Incidentally, concerning the chromaticity of a red LED, actually only one bin exists, so that the bin number of R is fixed.

For example, in the matrix shown in FIG. 5, in the case of R:G:B=1:1:1, the LEDs 21 of bins of c-1 of respective colors, one per each color, are combined, in the case of R:G:B=1:2:2, the LEDs 21 of bins of c-1 in R and c-1 and c-2 or c-2 and c-3 in G and B are combined, and in the case of R:G:B=1:3:3, the LEDs 21 of bins of c-1 in R, and c-1, c-2 and c-3 in G and B are combined to measure the mean values, maximum values, minimum values, and variances of JNDs.

As shown in FIGS. 6A and 6B, when the combination of respective bins is R:G:B=1:1:1, the mean value of JND is 2.7 and the maximum value is 3.6, which fall within a range less than 3.0 being an allowable range of the mean value and a range less than 4.0 being an allowable range of the maximum value, respectively, but when the combination of respective bins is R:G:B=1:2:2 and R:G:B=1:3:3, they exceed their allowable ranges, so that uneven color becomes marked to such an extent as not to reach the level of a product. Accordingly, it turns out that only one bin of chromaticity is used for each color of RGB.

From this result, the combination of LEDs 21 of respective colors of one bin is possible, but as described above, concerning the green LED, two LEDs 21 are placed in one LED unit 25. These two green LEDs 21 are placed relatively closer compared to their optical spreads, so that even if one green LED 21 having twice the average optical performance of two green LEDs 21 exists at an intermediate position of the two green LEDs 21, it can be assumed to be approximately correct. Accordingly, for example, whether the hypothesis that by totaling a combination of green LEDs of respective bins of a-1 and c-3 in a sequence of FIG. 5, two green LEDs of a bin of b-2 as their average are provided holds (whether the relation of <a-1>+<c-3>=2*<b-2> holds) is verified.

Figure 7A:
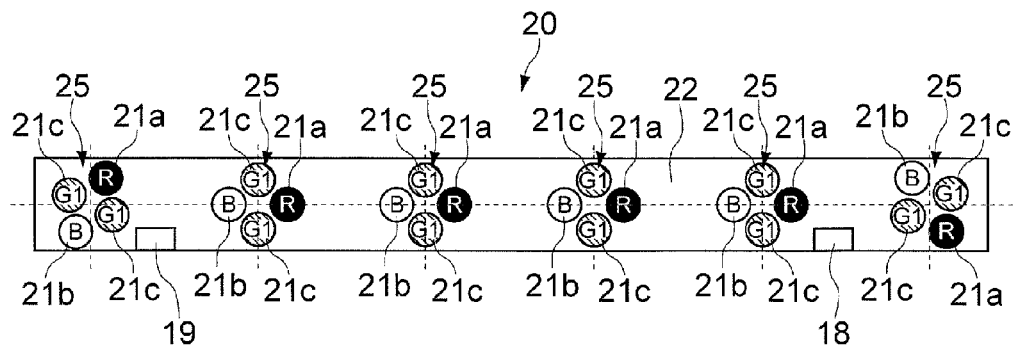
FIGS. 7A to 7C are views showing combination and arrangement examples of green LEDs of the backlight apparatus in the embodiment of the present invention.
Figure 7B:
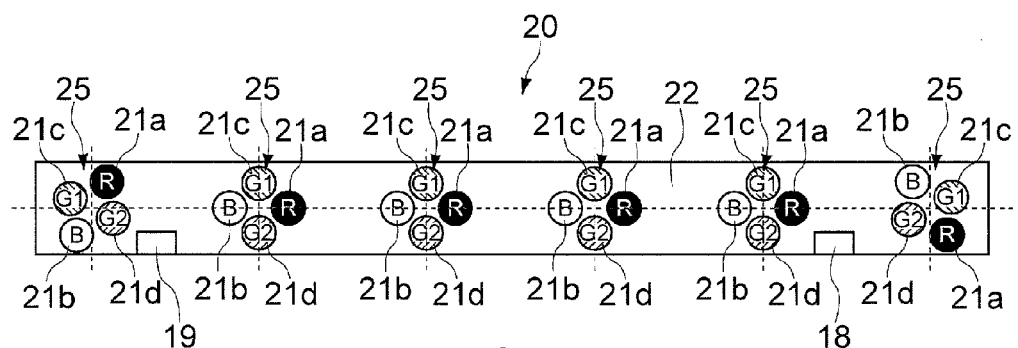
Figure 7C:
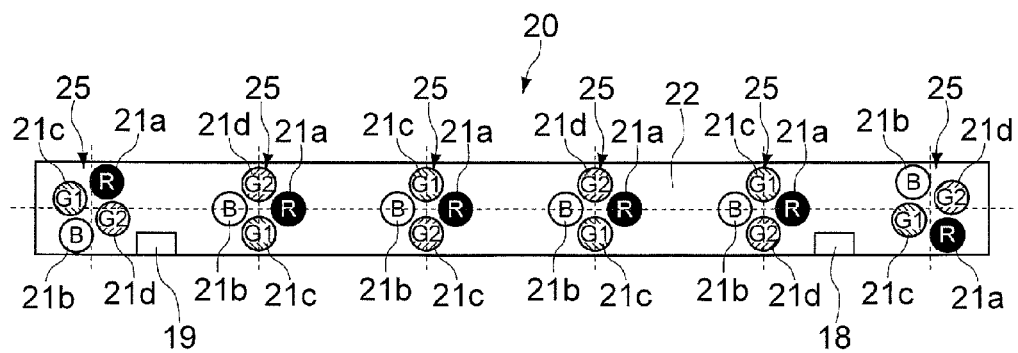

In this verification, three arrangement examples of respective LEDs 21 of the LED unit 25 is considered. FIGS. 7A to 7C show respective light source apparatuses 20 when these three arrangements are made.

FIG. 7A shows an example in which the LED unit 25 is constituted by using two green LEDs (G1s) 21c of the same bin (b-2) (BINNING-1). Incidentally, in one light source apparatus 20, respective LEDs 21 of each LED unit 25 are placed such that two green LEDs 21c arranged in the Y direction, and one blue LED 21b and one red LED 21a arranged in the X direction form a cross shape. Further, distances from the respective green LEDs 21c to the red LED 21a and the blue LED 21b are nearly equal. Note, however, that as concerns the LED units 25 at the far left and right, the arrangement is made in a cross shape shifted in an oblique direction instead of the cross shape in XY directions, and further, the left and right LED units 25 are symmetrically placed.

FIG. 7B shows a example in which green LEDs (G1s and G2s) 21c and 21d of two bins (a-1 and c-3) which are diagonally adjacent to one bin (b-2) are placed to be respectively aligned on the same sides (G1s on the upper side, G2s on the lower side) (BINNING-2).

FIG. 7C shows an example in which the green LEDs (G1s and G2s) of the same bins as in FIG. 7B are respectively placed in a zigzag manner along the X direction (BINNING-3). Namely, in respective LED units 25, the respective LEDs (G1s and G2s) 21c and 21d are arranged in a vertically staggered manner toward the X direction.

Figures 8A, 8B:
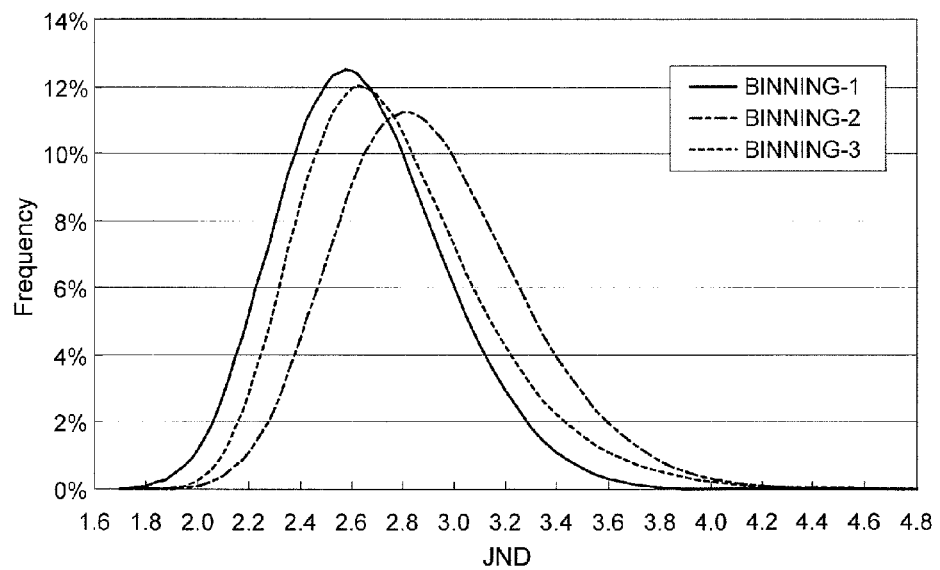
FIGS. 8A and 8B are diagrams showing simulation results of the combination and arrangement examples of the green LEDs of the backlight apparatus in the embodiment of the present invention.

The present inventor et al. obtain JND simulation results when the backlight apparatus 10 is constituted according to these three arrangement examples and driven. FIGS. 8A and 8B are diagrams showing the simulation results. Incidentally, when the light source apparatuses 20 of each of the arrangement examples shown in FIGS. 7A to 7C are mounted on the backlight apparatus 10, as described above, with respect to one light source apparatus 20, another light source apparatus 20 adjacent thereto in the X direction is provided while being inverted 180 degrees in the XY plane. Further, in this simulation, bins of LEDs of each color used in one light source apparatus 20 are the same, but in another light source apparatus 20, LEDs of each color may be constituted by a different bin.

As shown in FIGS. 8A and 8B, in BINNING-2, the variance results in approximately an intermediate value between BINNING-1 and BINNING-3, but the mean value results in the worst (highest) value. However, it is found that even if the same two green LEDs 21c and 21d are used, the result of BINNING-1 can be approached by adopting the arrangement example of BINNING-3 in which the LEDs 21c and 21d are placed in a zigzag manner.

This is because, since the respective light source apparatuses 20 adjacent in the Y direction are placed while being alternately inverted 180 degrees as described above, in the case of BINNING-2, between the adjacent light source apparatuses 20, the green LEDs 21c and 21d of the same bin (G1s and G2s) are respectively closely placed in the Y direction, which causes uneven color and uneven luminance, and in contrast, in the case of BINNING-3, by placing G1s and G2s respectively in a zigzag manner, G1s and G2s are not respectively closely placed between the adjacent light source apparatuses 20 even if they are inverted.

Namely, as can be seen also from FIG. 5, it is found that by adopting the arrangement example of BINNING-3, the range of bins of usable green LEDs nine-fold increases (2*<b-2>=<a-1>+<c-3>=<a-2>+<c-2>=<a-3>+<c-1>=<b-1>+<b-3>), and it becomes possible to accommodate variations among green LEDs which are the largest variations in actual manufacturing of LEDs. This makes it possible to combine a green LED having a chromaticity one level higher than that of a green LED of a bin of a targeted chromaticity and a green LED having a one-level lower one, and also concerning luminance, makes it possible to combine a green LED having a luminance one level higher than that of a green LED of a bin of a targeted luminance and a green LED having a one-level lower one. Namely, the flexibility of selection of LEDs increases, resulting in an improvement in yield, a reduction in excess product, a marked rise in the supply capacity of green LEDs, and thereby more stable production. As a result, the backlight apparatus 10 and the liquid crystal display apparatus 100 having highly uniform chromaticity and luminance can be stably provided.

Figure 9:
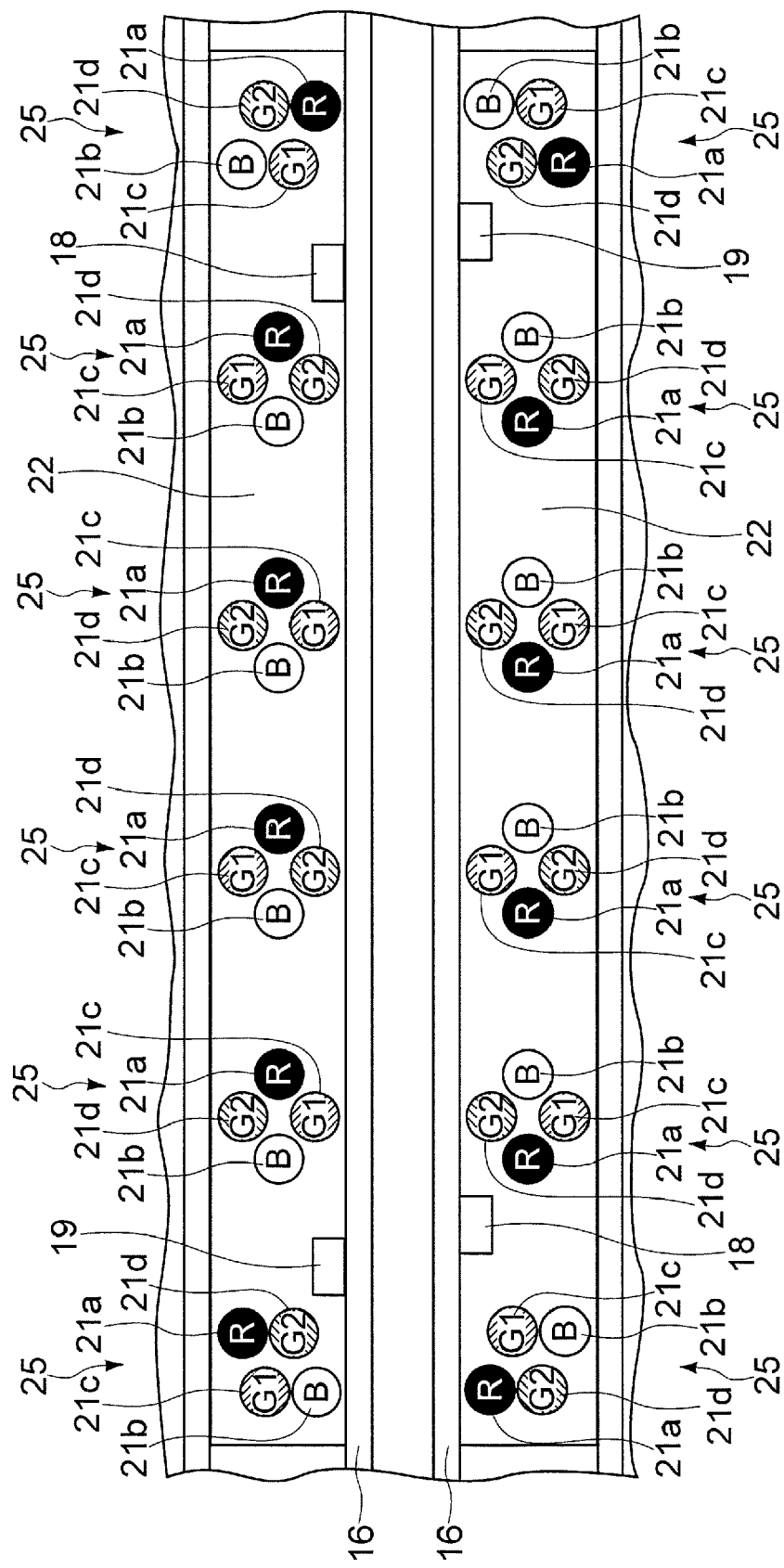
FIG. 9 is a partial enlarged view of the backlight apparatus shown in FIG. 3.

FIG. 9 is an enlarged view of a portion surrounded by a dotted line A in FIG. 3 of the backlight apparatus 10 adopting the above arrangement example of BINNING-3. As shown in FIG. 9, between the light source apparatuses 20 adjacent in the Y direction, G1s and G2s are uniformly placed without the distances between G1s and between G2s becoming shorter, which provides a structure in which the uneven color and uneven luminance do not tend to occur.

It is, of course, to be understood that the present invention is not intended to be limited only to the above embodiment and various changes may be made therein without departing from the spirit of the present invention.

In the above embodiment, one LED unit 25 includes a total of four LEDs 21 of one red LED 21a, one blue LED 21b, and two green LEDs 21c and 21d, but it is needless to say that the number of LEDs 21 is not limited to four and can be changed appropriately. For example, it is also possible that not only two green LEDs but also two blue LEDs are placed and thereby the LED unit 25 is constituted by a total of five LEDs 21. Further, it is also possible that two red LEDs are also placed and thereby the LED unit 25 is constituted by a total of six LEDs 21. In these cases, respective blue LEDs and/or red LEDs are constituted by LEDs having different chromaticities such that their average chromaticity is a predetermined chromaticity. Furthermore, as well as two LEDs, three or more LEDs 21 of each color may be used as long as these LEDs can be constituted such that their average chromaticity and/or luminance is a predetermined chromaticity and/or luminance.

In the above embodiment, the respective light source apparatuses 20 are arranged in four rows in the X direction and 12 columns in the Y direction, but the arrangement is not limited to this arrangement and can be changed appropriately according to the size of the liquid crystal panel 2. Moreover, instead of the arrangement in a matrix, an arrangement in either of the X direction or the Y direction is also possible.

What is claimed is:

1. A light source apparatus used in a backlight apparatus, comprising:
a plurality of light-emitting diode units each light-emitting diode unit including a plurality of light-emitting diodes of different colors placed closely and nonlinearly on a wiring board,
wherein,
the plurality of the light-emitting diode units are arranged at predetermined intervals in a predetermined direction on the wiring board,
each light-emitting diode unit includes one red light-emitting diode, one blue light-emitting diode, one first green light emitting diode having a first chromaticity and one second green light emitting diode having a second chromaticity which is different than the first chromaticity
the first and second diodes are configured such that the average chromaticity of the light emitting diode unit is equal to a predetermined value,
the red light-emitting diode and the blue light-emitting diode of each light-emitting unit are provided on a first line that is nearly parallel to the arrangement direction of the light emitting diode units on the wiring board,
the first green light-emitting diode and the second green light-emitting diode of each light emitting diode unit are provided on a second line nearly orthogonal to the first line such that respective distances from the first and second green light emitting diodes to the red light-emitting diode and the blue light emitting diode are nearly equal, and
the light emitting diode units are arranged such that the first green light-emitting diodes and the second green light-emitting diodes are arranged in a zig-zag pattern along the arrangement direction of the light-emitting diode units on the wiring board.

2. The light source apparatus as set forth in claim 1, wherein
in each light-emitting diode unit, a luminance of the first green light-emitting diode is different than a luminance of the second green light-emitting diode,
the first and second diodes are configured such that the average luminance of the light emitting diode unit is equal to a predetermined value.

3. A light source apparatus used in a backlight apparatus, comprising:
a light-emitting diode unit including a plurality of light emitting diodes of different colors arranged nonlinearly and closely on a wiring board,
wherein,
the plurality of the light-emitting diode units are arranged at predetermined intervals in a predetermined direction on the wiring board,
each light-emitting diode unit includes one red light-emitting diode, one blue light-emitting diode, one first green light emitting diode having a first chromaticity and a first luminance and one second green light emitting diode having a second chromaticity and a second luminance which are different than the first chromaticity and the first luminance,
the first and second diodes are configured such that the average chromaticity of the light emitting diode unit is equal to a predetermined value and the average luminance of the light-emitting diode unit is a predetermined value,
the red light-emitting diode and the blue light-emitting diode of each light-emitting unit are provided on a first line that is nearly parallel to the arrangement direction of the light emitting diode units on the wiring board,
the first green light-emitting diode and the second green light-emitting diode of each light emitting diode unit are provided on a second line nearly orthogonal to the first line such that respective distances from the first and second green light emitting diodes to the red light-emitting diode and the blue light emitting diode are nearly equal, and
the light emitting diode units are arranged such that the first green light-emitting diodes and the second green light-emitting diodes are arranged in a zig-zag pattern along the arrangement direction of the light-emitting diode units on the wiring board.

4. A backlight apparatus, comprising:
a plurality of light source apparatuses each including a plurality of light-emitting diode units with each light-emitting diode unit including a plurality of light-emitting diodes of different colors nonlinearly and closely placed on a wiring board,
wherein,
the plurality of the light-emitting diode units are arranged at predetermined intervals in a first direction on the wiring board,
the plurality of the light source apparatuses are placed in a matrix on the housing in a first direction and a second direction which is nearly orthogonal to the first direction,
each light-emitting diode unit includes one red light-emitting diode, one blue light-emitting diode, one first green light emitting diode having a first chromaticity and one second green light emitting diode having a second chromaticity which is different than the first chromaticity
the first and second diodes are configured such that the average chromaticity of the light emitting diode unit is equal to a predetermined value,
the red light-emitting diode and the blue light-emitting diode of each light-emitting unit are provided on a first line that is nearly parallel to the first direction of the light emitting diode units on the wiring board,
the first green light-emitting diode and the second green light-emitting diode of each light emitting diode unit are provided on a second line nearly orthogonal to the first line such that respective distances from the first and second green light emitting diodes to the red light-emitting diode and the blue light emitting diode are nearly equal, and
the light emitting diode units are arranged such that the first green light-emitting diodes and the second green light-emitting diodes are arranged in a zig-zag pattern along the first direction of the light-emitting diode units on the wiring board.

5. The backlight apparatus as set forth in claim 4, wherein the respective light source apparatuses each have first and second connectors provided at first and second positions, respectively, on the housing to electrically connect the respective light source apparatuses, the respective light source apparatuses being placed while being alternately inverted 180 degrees on the predetermined plane such that the first connector of one light source apparatus and the second connector of another light source apparatus which is adjacent to the one light source apparatus in the second direction face each other and the second connector of the one light source apparatus and the first connector of the other light source apparatus face each other.

6. A backlight apparatus, comprising:
a plurality of light source apparatuses each including a plurality of light-emitting diode units each light-emitting diode unit including a plurality of light-emitting diodes of different colors nonlinearly and closely placed on a wiring board,
wherein,
a plurality of the light source apparatuses are placed in a matrix on the wiring board in the first direction and a second direction nearly orthogonal to the first direction on a predetermined plan;
each light-emitting diode unit includes one red light-emitting diode, one blue light-emitting diode, one first green light emitting diode having a first chromaticity and a first luminance and one second green light emitting diode having a second chromaticity and a second luminance which are different than the first chromaticity and the first luminance,
the first and second diodes are configured such that the average chromaticity of the light emitting diode unit is equal to a predetermined value and the average luminance of the light-emitting diode unit is a predetermined value,
the red light-emitting diode and the blue light-emitting diode of each light-emitting unit are provided on a first line that is nearly parallel to the first direction of the light emitting diode units on the wiring board,
the first green light-emitting diode and the second green light-emitting diode of each light emitting diode unit are provided on a second line nearly orthogonal to the first line such that respective distances from the first and second green light emitting diodes to the red light-emitting diode and the blue light emitting diode are nearly equal, and the light emitting diode units are arranged such that the first green light-emitting diodes and the second green light-emitting diodes are arranged in a zig-zag pattern along the first direction of the light-emitting diode units on the wiring board.

7. The backlight apparatus as set forth in claim 6, wherein the respective light source apparatuses each have first and second connectors provided at first and second positions, respectively, on the wiring board to electrically connect the respective light source apparatuses, the respective light source apparatuses being placed while being alternately inverted 180 degrees on the predetermined plane such that the first connector of one light source apparatus and the second connector of another light source apparatus which is adjacent to the one light source apparatus in the second direction face each other and the second connector of the one light source apparatus and the first connector of the other light source apparatus face each other.

8. A manufacturing method of a backlight apparatus, comprising the steps of:

forming a plurality of light-emitting diode units each light-emitting diode unit including a plurality of light-emitting diodes;

forming a light source apparatus by arranging the plurality of light-emitting diode units nonlinearly and closely in a first direction on a wiring board and placing a plurality of the light source apparatuses in a matrix in the first direction and a second direction nearly orthogonal to the first direction on a predetermined plane in a housing, wherein, each light-emitting diode unit includes one red light-emitting diode, one blue light-emitting diode, one first green light emitting diode having a first chromaticity and one second green light emitting diode having a second chromaticity which is different than the first chromaticity, the first and second diodes are configured such that the average chromaticity of the light emitting diode unit is equal to a predetermined value, the red light-emitting diode and the blue light-emitting diode of each light-emitting unit are provided on a first line that is nearly parallel to the first direction of the light emitting diode units on the wiring board, the first green light-emitting diode and the second green light-emitting diode of each light emitting diode unit are provided on a second line nearly orthogonal to the first line such that respective distances from the first and second green light emitting diodes to the red light-emitting diode and the blue light emitting diode are nearly equal, and the light emitting diode units are arranged such that the first green light-emitting diodes and the second green light-emitting diodes are arranged in a zig-zag pattern along the first direction of the light-emitting diode units on the wiring board.

9. A liquid crystal display apparatus, comprising:

a plurality of backlight apparatuses each including a plurality light source apparatuses each having a plurality light-emitting diode units each including a plurality of light-emitting diodes of different colors nonlinearly and closely arranges on a wiring board; and a liquid crystal panel allowing a picture to be displayed by changing a transmittance of emitted light from the light-emitting diode unit wherein, each of plurality of the light-emitting diode units are arranged on the wiring board at predetermined intervals in a first direction, and each of the backlight apparatuses are arranged in a matrix in a housing in a first direction and a second direction nearly orthogonal to the first direction, each light-emitting diode unit includes one red light-emitting diode, one blue light-emitting diode, one first green light emitting diode having a first chromaticity and a first luminance and one second green light emitting diode having a second chromaticity and a second luminance which are different than the first chromaticity and the first luminance, the first and second diodes are configured such that the average chromaticity of the light emitting diode unit is equal to a predetermined value and the average luminance of the light-emitting diode unit is a predetermined value, the red light-emitting diode and the blue light-emitting diode of each light-emitting unit are provided on a first line that is nearly parallel to the first direction of the light emitting diode units on the wiring board, the first green light-emitting diode and the second green light-emitting diode of each light emitting diode unit are provided on a second line nearly orthogonal to the first line such that respective distances from the first and second green light emitting diodes to the red light-emitting diode and the blue light emitting diode are nearly equal, and the light emitting diode units are arranged such that the first green light-emitting diodes and the second green light-emitting diodes are arranged in a zig-zag pattern along the first direction of the light-emitting diode units on the wiring board.

* * * * *